June 27, 1967   L. A. CLEMENTS   3,327,379
ENTRY CAP AND METHOD OF USING SAME TO
ASSEMBLE A PIPE JOINT
Filed Jan. 4, 1965
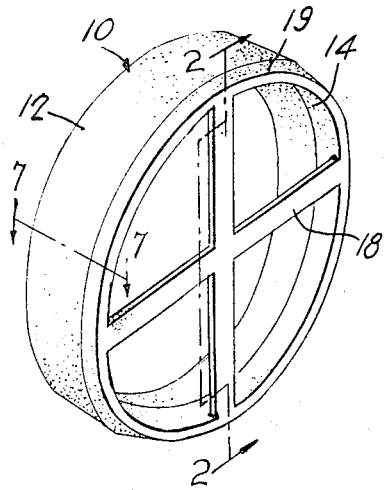
FIG.1
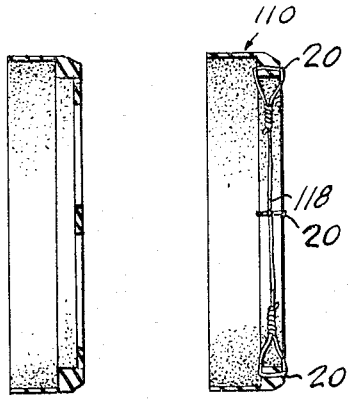
FIG.2   FIG.3
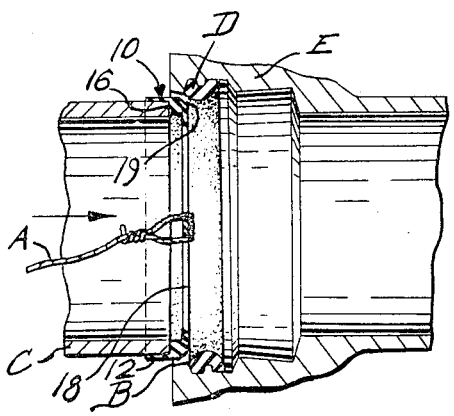
FIG.4
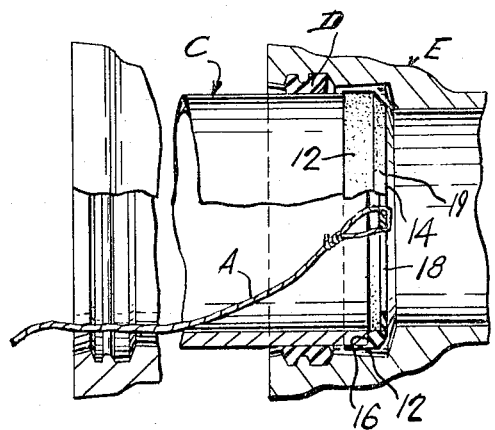
FIG.5
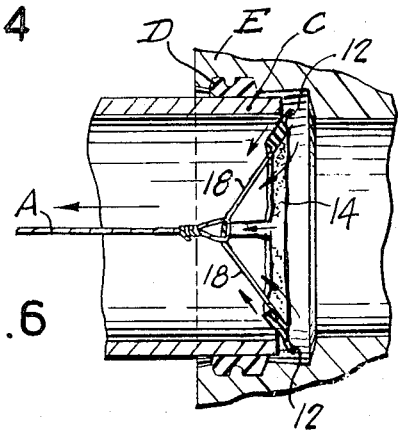
FIG.6
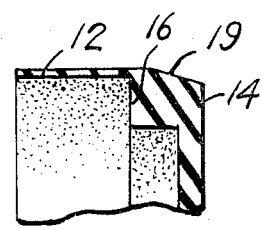
FIG.7
INVENTOR
Loydell Ames CLEMENTS
ATTORNEY United States Patent Office 3,327,379
Patented June 27, 1967

3,327,379
ENTRY CAP AND METHOD OF USING SAME TO ASSEMBLE A PIPE JOINT
Loydell Ames Clements, Laval West, Quebec, Canada, assignor to Canada Iron Foundries, Limited, Montreal, Quebec, Canada
Filed Jan. 4, 1965, Ser. No. 423,184
12 Claims. (Cl. 29—450)

The present invention relates to the installation and interconnection of pipes and especially to a device whereby the interconnection of pipes in the field is greatly aided.

The type of pipe with which the invention is concerned is of the type having mating spigot and bell ends which are usually a push fit using a rubber gasket as the sealing medium. In order that the assembly can be readily made, the spigot ends require a bevel for their entry into the mating bell ends and this is normally made in the course of their manufacture. However, when a pipe of this type is cut in the field, for example to install a fitting, the cut end must be filed by hand or ground to produce the required bevel, or taper.

As will be appreciated this is a time consuming and arduous job since the pipes may run in diameter from anywhere from about 2" to about 48" and to about 20' in length which makes them awkward to handle. As previously noted, the bevel must be sufficient to permit ready entry of the spigot end within the bell, and moreover, since a sealing gasket is utilized between the mating ends care must be taken to remove any sharp edge on the spigot end which would tend to damage the gasket, usually prelocated within the bell end, when the spigot end is forced home.

The present invention recognizes this problem and aims to provide a solution by providing an entry cap which will readily fit over the cut spigot end to provide the necessary bevel for the entry. In accordance with the invention this entry cap is of an annular form having a relatively thin outer flange which fits snugly about the pipe end so as to support and align a relatively thicker bevelled end portion which acts to guide the spigot end into the bell. The entry cap of the invention is preferably made of a flexible resilient material such as rubber or the like and means are provided on the cap for attachment of a wire or cord which is passed through the interior of the pipe. With this arrangement, once the joint is nearly complete, the entry cap is withdrawn by pulling it inwards through the pipe and then the joint is completed by forcing the spigot home within the bell. This may in some cases be done in one step depending on the design of the joint clearance.

In any case the cap should not be withdrawn until it has passed the gasket so that the cut-off end of the pipe cannot possibly cause any damage.

Having thus generally described the nature of the invention, particular reference will be made to the accompanying drawing showing preferred embodiments thereof, and in which;

FIGURE 1 is a view in perspective elevation of a preferred form of an entry cap according to the invention.

FIGURE 2 is a cross-sectional view of the construction shown in FIGURE 1 as seen along the line 2—2.

FIGURE 3 is a cross-section corresponding to FIGURE 2 of an alternative form of entry ring where the integral diametrically extending crossbars are eliminated and replaced by length of wire.

FIGURE 4 is a view in cross-section of the mating spigot and bell ends of a pair of pipes to be connected with a sealing gasket in place and an entry cap, as shown in FIGURE 1, in operative position for entry of the spigot.

FIGURE 5 is a view corresponding to FIGURE 4 with the joint nearly complete, the entry cap being forced past the sealing gasket and in condition for withdrawal.

FIGURE 6 is a view corresponding to FIGURES 4 and 5 showing the entry cap partially withdrawn into the interior of the spigot end pipe.

FIGURE 7 is an enlarged detail view in cross-section of a portion of the entry cap construction of FIGURE 1 as seen along the line 7—7.

With particular reference to FIGURES 1 and 2, a preferred form of entry cap in accordance with the invention is shown as consisting of an annular body 10 having a relatively thin outer flange 12 extending from a heavier bevelled entry portion 14 with an inner annular shoulder 16 therebetween which is adapted to seat against the cut end of a pipe as shown in FIGURE 4 for example. Integral crossbars 18 extend diametrically across the interior of the cap entry portion 14 so as to provide an attachment point for a cord or wire A by means of which the cap may be withdrawn as will be described later. Preferably the cap 10 is made as an integral unit for example by moulding from rubber or a plastic material having the desired resiliency and strength with the inner diameter of the cap 10 at the junction of the annular shoulder 16 being preferably slightly less than the outside diameter of the pipe to ensure a snug united fit. To provide the necessary bevel the entry portion 14 is suitably tapered as indicated at 19.

The alternative construction 110 shown in FIGURE 3 is of smaller shape to the cap 10 with the difference that the crossbars 18 are eliminated and replaced by lengths of wire 118 extending across the cap and secured in position by passing through suitable openings 20. These wires 18 are used as a point of attachment for a cord or wire A in a similar manner to the crossbars 18. As an example, a preferred form of the entry cap as shown in FIGURE 1 of the drawing was moulded from rubber to suit a cast-iron pipe having a 6" I.D. with the outer flange 12 being about 7/8" in depth from the shoulder 16 and about .030" thick with an inside diameter of about 6.80". The width of the crossbars 18 were about ½" with a thickness of about ⅛" with the entry portion 14 being about ½" thick in the axial direction and about ⅜" thick at the base in the trans-axial direction. The bevel or taper 19 was about 20° or slightly less than the usual 30° bevel on the manufactured pipe. This was tested thoroughly on two full lengths of pipe and results were satisfactory with the entry cap being readily withdrawn and re-used several times. As will be understood, the bell end of the pipe should be looked at for projecting sharp edges or the like to prevent possible cuts or damage which would reduce the "life" of the cap.

In use the entry caps 10 or 110 are placed over the cut end B of the spigot end C of a pipe with the cord A being passed through the interior of the pipe as shown. In the example illustrated in FIGURES 4 and 5 an annular sealing gasket D is utilized between the mating pipe ends so that when the entry cap 10, preferably suitably lubricated prior to assembly on the pipe, is guided by its bevel 19 into the mating pipe end E it slides past the gasket D as shown in FIGURE 5. Tension on the cord A pulls the crossbars 18 inwardly and the entire entry cap 10 slides off its position on the cut end C into the interior of the pipe, as shown in FIGURE 6. The spigot end C of the pipe is then urged to its final position completing the assembly. As will be obvious from the preceding description and the accompanying drawing, as the entry cap forces its way past the gasket D, friction may tend to force the upper entry portion 14 of the cap outward. In most cases, the opposing surfaces of the pipe ends keep the cap in alignment but the crossbars 18, or equivalent also act to some degree as dimension stabilizing means and help to prevent such distortion maintaining the cap in position permitting ready entry.

I claim:

1. An entry cap adapted for use in combination with the untapered spigot end of a spigot and bell end pipe connection, said entry cap comprising a flexible body of annular formation adapted to be fitted over said pipe end and having a relatively thick leading end terminating in a trans-axial face and an exterior peripheral surface having an inwardly tapered end portion meeting said trans-axial face, an integral relatively thin dependent flange extending concentrically outwards from said exterior peripheral face away from said tapered end, the interior diameter of said flange being slightly less than the exterior diameter of said pipe, and means extending across the interior of said body adapted to provide a point of axial attachment for means for withdrawing said cap when said pipe connection is substantially completed.

2. An entry cap as claimed in claim 1 wherein the junction between the interior surfaces of said cap leading end and said dependent flange form an outstanding annular shoulder adapted to butt against said spigot pipe end when said cap is in operative position.

3. An entry cap as claimed in claim 1 wherein said attachment means comprises at least one length of flexible material attached to said annular body at diametrically opposed points.

4. An entry cap as claimed in claim 3 wherein said attachment means comprises integral flexible crossbars extending diametrically across the interior of said annular body.

5. An entry cap adapted for use in combination with the untapered spigot end of a spigot and bell end pipe connection, said entry cap comprising a flexible body of annular formation adapted to be fitted over said pipe end and having a relatively thick leading end terminating in a trans-axial face and an exterior peripheral surface having an inwardly tapered end portion meeting said trans-axial face, an integral relatively thin dependent flange extending concentrically outwards from said exterior peripheral face away from said tapered end, the interior diameter of said flange being slightly less than the exterior diameter of said pipe, and dimension stabilizing means extending across the interior of said body to at least aid in preventing said body from distortion under external frictional engagement and being adapted to provide a point of axial attachment for means for withdrawing said cap when said pipe connection is substantially completed.

6. An entry cap as claimed in claim 5 wherein the junction between the interior surfaces of said cap leading end and said dependent flange form an outstanding annular shoulder adapted to butt against said spigot pipe end when said cap is in operative position.

7. An entry cap as claimed in claim 5 wherein said dimension stabilizing means comprises at least one length of flexible material attached to said annular body at diametrically opposed points.

8. An entry cap as claimed in claim 5 wherein said dimension stabilizing means comprises integral flexible crossbars extending diametrically across the interior of said annular body.

9. A method of making a joint between a first pipe having a spigot end with an unbevelled flat end surface and a second pipe having a spigot receiving bell end including an internal flexible sealing gasket, comprising the steps of placing a flexible entry cap having a bevelled leading end over said spigot end, forcing said entry cap and spigot end within said bell end until said entry cap has passed said flexible gasket, passing a flexible member through said spigot end pipe to a connection with said flexible cap, withdrawing said flexible cap through said spigot end pipe, and finally urging said spigot end fully within said bell end to complete said joint.

10. An entry cap comprising a flexible body of annular formation adapted to be fitted over an untapered pipe end and having a relatively thick leading end terminating in a trans-axial face and an exterior peripheral surface having an inwardly tapered end portion meeting said trans-axial face, an integral relatively thin dependent flange extending concentrically outwards from said exterior peripheral face away from said tapered end, the interior diameter of said flange being slightly less than the exterior diameter of said pipe, and means extending across the interior of said body adapted to provide a point of axial attachment for means for withdrawing said cap.

11. An entry cap comprising a flexible body of annular formation adapted to be fitted over an untapered pipe end and having a relatively thick leading end terminating in a trans-axial face and an exterior peripheral surface having an inwardly tapered end portion meeting said trans-axial face, an integral relatively thin dependent flange extending concentrically outwards from said exterior peripheral face away from said tapered end, the interior diameter of said flange being slightly less than the exterior diameter of said pipe, and dimension stabilizing means extending across the interior of said body to at least aid in preventing said body from distortion under external frictional engagement and being adapted to provide a point of axial attachment for means for withdrawing said cap.

12. A method of making a joint between a first pipe having an unbevelled flat end surface and a second mating connection including an internal flexible sealing gasket, comprising the steps of placing a flexible entry cap having a bevelled leading end over the unbevelled flat end surface of said first pipe, forcing said entry cap thus mounted on said first pipe within second mating connection until said entry cap has passed said flexible gasket, passing a flexible member through said first pipe to a connection with said flexible cap, withdrawing said flexible cap through said first pipe, and finally urging said first pipe within said second mating connection to complete said joint.

References Cited

UNITED STATES PATENTS

| 2,118,290 | 5/1938 | Black | 138—42 |
| 2,146,641 | 2/1939 | McWane. | |
| 2,329,000 | 9/1943 | Rembert | 29—451 |
| 2,977,993 | 4/1961 | Scherer | 138—96 |
| 3,168,779 | 2/1965 | Schustack | 29—235 X |
| 3,199,902 | 8/1965 | Fierstine | 138—96 X |
| 3,282,610 | 11/1966 | White | 285—18 |

CHARLIE T. MOON, *Primary Examiner.*